(12) United States Patent
Brokenshire et al.

(10) Patent No.: US 8,533,251 B2
(45) Date of Patent: *Sep. 10, 2013

(54) OPTIMIZED CORNER TURNS FOR LOCAL STORAGE AND BANDWIDTH REDUCTION

(75) Inventors: Daniel A. Brokenshire, Round Rock, TX (US); John A. Gunnels, Yorktown Heights, NY (US); Michael D. Kistler, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1321 days.

This patent is subject to a terminal disclaimer.

(21) Appl. No.: 12/125,996

(22) Filed: May 23, 2008

(65) Prior Publication Data

US 2009/0292758 A1 Nov. 26, 2009

(51) Int. Cl.
*G06F 7/52* (2006.01)
*G06F 7/32* (2006.01)
*G06F 7/38* (2006.01)

(52) U.S. Cl.
USPC .......................... 708/607; 708/514; 708/520

(58) Field of Classification Search
USPC .......................... 708/514, 520, 607, 620–632
See application file for complete search history.

(56) References Cited

U.S. PATENT DOCUMENTS

| | | | |
|---|---|---|---|
| 4,553,220 A | 11/1985 | Swanson | |
| 4,701,876 A | 10/1987 | McCanny et al. | |
| 5,099,447 A * | 3/1992 | Myszewski | 708/607 |
| 5,420,811 A | 5/1995 | Ohki | |
| 5,905,666 A | 5/1999 | Hoffman et al. | |
| 6,125,212 A | 9/2000 | Kresch et al. | |
| 6,675,187 B1 | 1/2004 | Greenberger | |
| 6,694,343 B2 | 2/2004 | Forrest et al. | |

(Continued)

FOREIGN PATENT DOCUMENTS

| | | |
|---|---|---|
| JP | 7-152726 | 6/1995 |
| JP | 2002-125118 | 4/2002 |

OTHER PUBLICATIONS

M. Bader and C. Zenger, "Cache Oblivious Matrix Multiplication Using an Element Ordering Based on a Peano Curve," Linear Algebra and Its Applications, vol. 417, Nos. 2-3, 2006.*

(Continued)

*Primary Examiner* — Chat Do
*Assistant Examiner* — Matthew Sandifer
(74) *Attorney, Agent, or Firm* — Stephen R. Tkacs; Stephen J. Walder, Jr.; Matthew B. Talpis

(57) ABSTRACT

A block matrix multiplication mechanism is provided for reversing the visitation order of blocks at corner turns when performing a block matrix multiplication operation in a data processing system. By reversing the visitation order, the mechanism eliminates a block load at the corner turns. In accordance with the illustrative embodiment, a corner return is referred to as a "bounce" corner turn and results in a serpentine patterned processing order of the matrix blocks. The mechanism allows the data processing system to perform a block matrix multiplication operation with a maximum of three block transfers per time step. Therefore, the mechanism reduces maximum throughput and increases performance. In addition, the mechanism also reduces the number of multi-buffered local store buffers.

8 Claims, 6 Drawing Sheets

| TIME STEP | LOAD | | STORE | BLOCKS TRANSFERRED | COMPUTE | COMMENT |
|---|---|---|---|---|---|---|
| 0 | [C$_{3,3}$] | [A$_{2,3}$] | [B$_{3,2}$] | 3 | | |
| 1 | [C$_{3,4}$] | [A$_{2,4}$] | | 2 | [C$_{3,3}$]−=[A$_{2,3}$] * [B$_{3,2}$] | |
| 2 | [C$_{3,5}$] | [A$_{2,5}$] | [C$_{3,3}$] | 3 | [C$_{3,4}$]−=[A$_{2,4}$] * [B$_{3,2}$] | |
| 3 | [C$_{4,5}$] | [B$_{4,2}$] | [C$_{3,4}$] | 3 | [C$_{3,5}$]−=[A$_{2,5}$] * [B$_{3,2}$] | BOUNCE, CHANGE DIRECTION |
| 4 | [C$_{4,4}$] | [A$_{2,4}$] | [C$_{3,5}$] | 3 | [C$_{4,5}$]−=[A$_{2,5}$] * [B$_{4,2}$] | |
| 5 | [C$_{4,5}$] | [A$_{2,3}$] | [C$_{4,5}$] | 3 | [C$_{4,4}$]−=[A$_{2,4}$] * [B$_{4,2}$] | |
| 6 | [C$_{5,3}$] | [B$_{5,2}$] | [C$_{4,4}$] | 3 | [C$_{4,3}$]−=[A$_{2,3}$] * [B$_{4,2}$] | BOUNCE, CHANGE DIRECTION |
| 7 | [C$_{5,4}$] | [A$_{2,4}$] | [C$_{4,3}$] | 3 | [C$_{5,3}$]−=[A$_{2,3}$] * [B$_{5,2}$] | |
| 8 | [C$_{5,5}$] | [A$_{2,5}$] | [C$_{5,3}$] | 3 | [C$_{5,4}$]−=[A$_{2,4}$] * [B$_{5,2}$] | |
| 9 | | | [C$_{5,4}$] | 1 | [C$_{5,5}$]−=[A$_{2,5}$] * [B$_{5,2}$] | |
| 10 | | | [C$_{5,5}$] | 1 | | |

(56) References Cited

U.S. PATENT DOCUMENTS

| | | | |
|---|---|---|---|
| 7,028,168 B2* | 4/2006 | Wadleigh | 712/221 |
| 7,236,998 B2 | 6/2007 | Nutter et al. | |
| 7,337,205 B2* | 2/2008 | Sazegari | 708/607 |
| 7,469,266 B2* | 12/2008 | Gustavson et al. | 708/520 |
| 7,475,101 B2* | 1/2009 | Gustavson et al. | 708/200 |
| 7,482,937 B2 | 1/2009 | Chai et al. | |
| 2004/0122887 A1 | 6/2004 | Macy | |
| 2006/0064452 A1 | 3/2006 | Nakanishi | |
| 2006/0161612 A1* | 7/2006 | Gustavson et al. | 708/495 |
| 2006/0173947 A1 | 8/2006 | Gustavson et al. | |
| 2007/0271325 A1* | 11/2007 | Juffa et al. | 708/607 |
| 2009/0300091 A1 | 12/2009 | Brokenshire et al. | |
| 2010/0017450 A1* | 1/2010 | Sun et al. | 708/401 |
| 2010/0318758 A1* | 12/2010 | Agrawal et al. | 711/170 |

OTHER PUBLICATIONS

G. Gao, J. N. Amaral, A. Marquez, and K. Theobald; "A refinement of the HTMT program execution model," CAPSL Tech. Memo 22, Dept. of Elec. and Computer Eng., U. of Delaware, Jul. 1998.*

Wunderlich, R., Puschel, M., and Hoe, J.: "Accelerating blocked matrix-matrix multiplication using a software-managed memory hierarchy with DMA". High Performance Embedded Computing Workshop, MIT, 2005.*

U.S. Appl. No. 12/129,789.

Notice of Allowance mailed Apr. 13, 2012 for U.S. Appl. No. 12/129,789, 5 pages.

Response to Office Action filed with the USPTO Mar. 27, 2012 for U.S. Appl. No. 12/129,789, 8 pages.

U.S. Appl. No. 13/451,967.

* cited by examiner

```
for (x=bc+1; x<N/M; x++) {
  get ( [B_x,bc] )
  for (y=bc+1; y<N/M; y++) {
    get ( [A_bc,y] )
    get ( [C_x,y] )
    [C_x,y] -= [A_bc,y] * [B_x,bc]    // block matrix multiply
    put ( [C_x,y] )
  }
}
```

| TIME STEP | LOAD | | STORE | BLOCKS TRANSFERRED | COMPUTE | COMMENT |
|---|---|---|---|---|---|---|
| 0 | $[C_{3,3}]$ | $[B_{3,2}]$ | | 3 | | |
| 1 | $[C_{3,4}]$ | | | 2 | $[C_{3,3}] -= [A_{2,3}] * [B_{3,2}]$ | |
| 2 | $[C_{3,5}]$ | $[B_{4,2}]$ | $[C_{3,3}]$ | 3 | $[C_{3,4}] -= [A_{2,4}] * [B_{3,2}]$ | |
| 3 | $[C_{4,3}]$ | | $[C_{3,4}]$ | 4 | $[C_{3,5}] -= [A_{2,5}] * [B_{3,2}]$ | CORNER TURN |
| 4 | $[C_{4,4}]$ | $[B_{5,2}]$ | $[C_{3,5}]$ | 3 | $[C_{4,3}] -= [A_{2,3}] * [B_{4,2}]$ | |
| 5 | $[C_{4,5}]$ | | $[C_{4,3}]$ | 3 | $[C_{4,4}] -= [A_{2,4}] * [B_{4,2}]$ | |
| 6 | $[C_{5,3}]$ | | $[C_{4,4}]$ | 4 | $[C_{4,5}] -= [A_{2,5}] * [B_{4,2}]$ | CORNER TURN |
| 7 | $[C_{5,4}]$ | | $[C_{4,5}]$ | 3 | $[C_{5,3}] -= [A_{2,3}] * [B_{5,2}]$ | |
| 8 | $[C_{5,5}]$ | | $[C_{5,3}]$ | 3 | $[C_{5,4}] -= [A_{2,4}] * [B_{5,2}]$ | |
| 9 | | | $[C_{5,4}]$ | 1 | $[C_{5,5}] -= [A_{2,5}] * [B_{5,2}]$ | |
| 10 | | | $[C_{5,5}]$ | 1 | | |

BUFFER 0 | BUFFER 1

*FIG. 4*

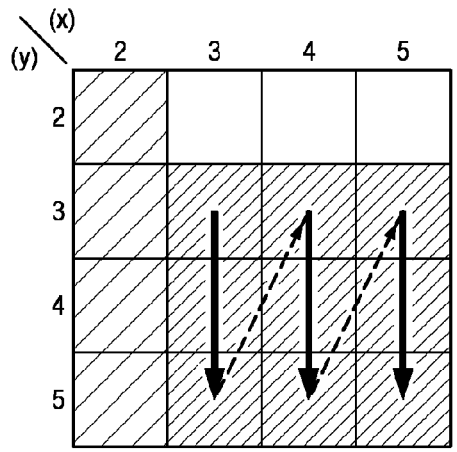
*FIG. 5A*
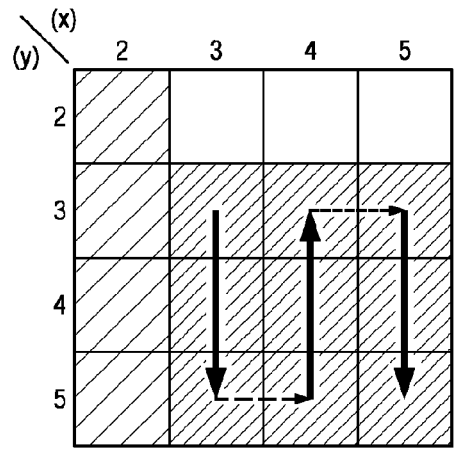
*FIG. 5B*
```
down = true
for (x=bc+1; x<N/M; x++) {
  for (i=1; i< (N/M-bc) ; i++) {
    if (down) y = bc+i
    else      y = N/M - i
    if (i==1) {
      get ( [A_bc,y] )
    } else {
      get ( [B_x,bc] )
    }
    get ( [C_x,y] )
    [C_x,y] -= [A_i,y] * [B_x,y]
    put ( [C_x,y] )
  }
  down = !down      // change direction for next loop iteration
}
```
*FIG. 6*

| TIME STEP | LOAD | | STORE | BLOCKS TRANSFERRED | COMPUTE | COMMENT |
|---|---|---|---|---|---|---|
| 0 | $[C_{3,3}]$ | $[A_{2,3}]$ | | | | |
| 1 | $[C_{3,4}]$ | $[A_{2,4}]$ | | 3 | $[C_{3,3}] -= [A_{2,3}] * [B_{3,2}]$ | |
| 2 | $[C_{3,5}]$ | $[A_{2,5}]$ | $[C_{3,3}]$ | 2 | $[C_{3,4}] -= [A_{2,4}] * [B_{3,2}]$ | |
| 3 | $[C_{4,5}]$ | $[B_{4,2}]$ | $[C_{3,4}]$ | 3 | $[C_{3,5}] -= [A_{2,5}] * [B_{3,2}]$ | BOUNCE, CHANGE DIRECTION |
| 4 | $[C_{4,4}]$ | $[A_{2,4}]$ | $[C_{3,5}]$ | 3 | $[C_{4,5}] -= [A_{2,5}] * [B_{4,2}]$ | |
| 5 | $[C_{4,3}]$ | $[A_{2,3}]$ | $[C_{4,5}]$ | 3 | $[C_{4,4}] -= [A_{2,4}] * [B_{4,2}]$ | |
| 6 | $[C_{5,3}]$ | $[B_{5,2}]$ | $[C_{4,4}]$ | 3 | $[C_{4,3}] -= [A_{2,3}] * [B_{4,2}]$ | BOUNCE, CHANGE DIRECTION |
| 7 | $[C_{5,4}]$ | $[A_{2,4}]$ | $[C_{4,3}]$ | 3 | $[C_{5,3}] -= [A_{2,3}] * [B_{5,2}]$ | |
| 8 | $[C_{5,5}]$ | $[A_{2,5}]$ | $[C_{5,3}]$ | 3 | $[C_{5,4}] -= [A_{2,4}] * [B_{5,2}]$ | |
| 9 | | | $[C_{5,4}]$ | 1 | $[C_{5,5}] -= [A_{2,5}] * [B_{5,2}]$ | |
| 10 | | | $[C_{5,5}]$ | 1 | | |

OPTIMIZED CORNER TURNS FOR LOCAL STORAGE AND BANDWIDTH REDUCTION

BACKGROUND OF THE INVENTION

1. Field of the Invention

The present application relates generally to an improved data processing apparatus and method and more specifically to a mechanism to optimize corner turns for local storage and bandwidth reduction.

2. Background of the Invention

The Cell Broadband Engine (Cell/B.E.) architecture contains a hierarchical memory subsystem consisting of generalized system memory and specialized synergistic processor element (SPE) local storage (LS). Data is transferred between these two memory domains via direct memory access (DMA) operations serviced by the SPE's memory flow controller (MFC). Block matrix multiplication is performed on the Cell/B.E. Double buffering techniques are used by the SPEs to hide the latency of data transfers.

In the mathematical discipline of matrix theory, a block matrix or a partitioned matrix is a partition of a matrix into rectangular smaller matrices called blocks. Looking at it another way, the matrix is written in terms of smaller matrices horizontally and vertically adjacent. A block matrix must conform to a consistent way of splitting up the rows and the columns. The partition is into the rectangles described by one bunch of adjacent rows crossing one bunch of adjacent columns. In other words, the matrix is split up by some horizontal and vertical lines that go all the way across.

The general matrix multiply (GEMM) is a subroutine in the basic linear algebra subprograms (BLAS) which performs matrix multiplication that is the multiplication of two matrices. Double precision is a computer numbering format that occupies two adjacent storage locations in computer memory. A double precision number, sometimes simply called a double, may be defined to be an integer, fixed point, or floating point. For example, computers with 32-bit stores (single precision) may provide 64-bit double precision. A double precision general matrix multiply (DGEMM) is often tuned by high performance computing (HPC) vendors to run as fast as possible, because it is the building block for so many other routines. It is also the most important routine in the LINPACK benchmark. For this reason, implementations of fast BLAS library may focus first on DGEMM performance.

BRIEF SUMMARY OF THE INVENTION

In one illustrative embodiment, a method, in a data processing system, is provided for optimized corner turns for local storage and bandwidth reduction. The method comprises, for each block in a column or row of a block matrix multiplication operation, loading one block of a first block matrix or one block of a second block matrix from a system memory into a local store, loading one block of a third block matrix from a system memory to the local store, performing a block matrix multiplication operation on a block of the first block matrix and a block of the second block matrix to form a product, subtracting the product from a block of the third block matrix to form a result block of the third block matrix, and storing a result block of the third block matrix from the local store to the system memory. The method comprises repeating the block matrix multiplication operation in a next column or row with a reversed visitation order such that a block transfer is eliminated at each corner turn to reduce memory bandwidth requirements in the data processing system for the block matrix multiplication operation.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is a table illustrating an example timeline for a double precision general matrix multiply solve in accordance with an illustrative embodiment;

FIG. 5A illustrates block load order for block matrix multiplication with corner turns in accordance with one exemplary embodiment;

FIG. 5B illustrates a block load order for block matrix multiplication with bounce corner turns in accordance with an illustrative embodiment;

FIG. 6 depicts pseudo code for a double precision general matrix multiplication operation with optimized corner turns in accordance with an illustrative embodiment;

DETAILED DESCRIPTION OF THE INVENTION

The illustrative embodiments provide a mechanism for reversing the visitation order of blocks at corner turns when performing a block matrix multiplication operation in a data processing system. By reversing the visitation order, the mechanism eliminates a block load at the corner turns. In accordance with the illustrative embodiment, a corner turn is referred to as a "bounce" corner turn and results in a serpentine patterned processing order of the matrix blocks. The mechanism allows the data processing system to perform a block matrix multiplication operation with a maximum of three block transfers per time step. Therefore, the mechanism reduces maximum throughput and increases performance. In addition, the mechanism also reduces the number of multi-buffered LS buffers from 6 to 5.

Figure 1:
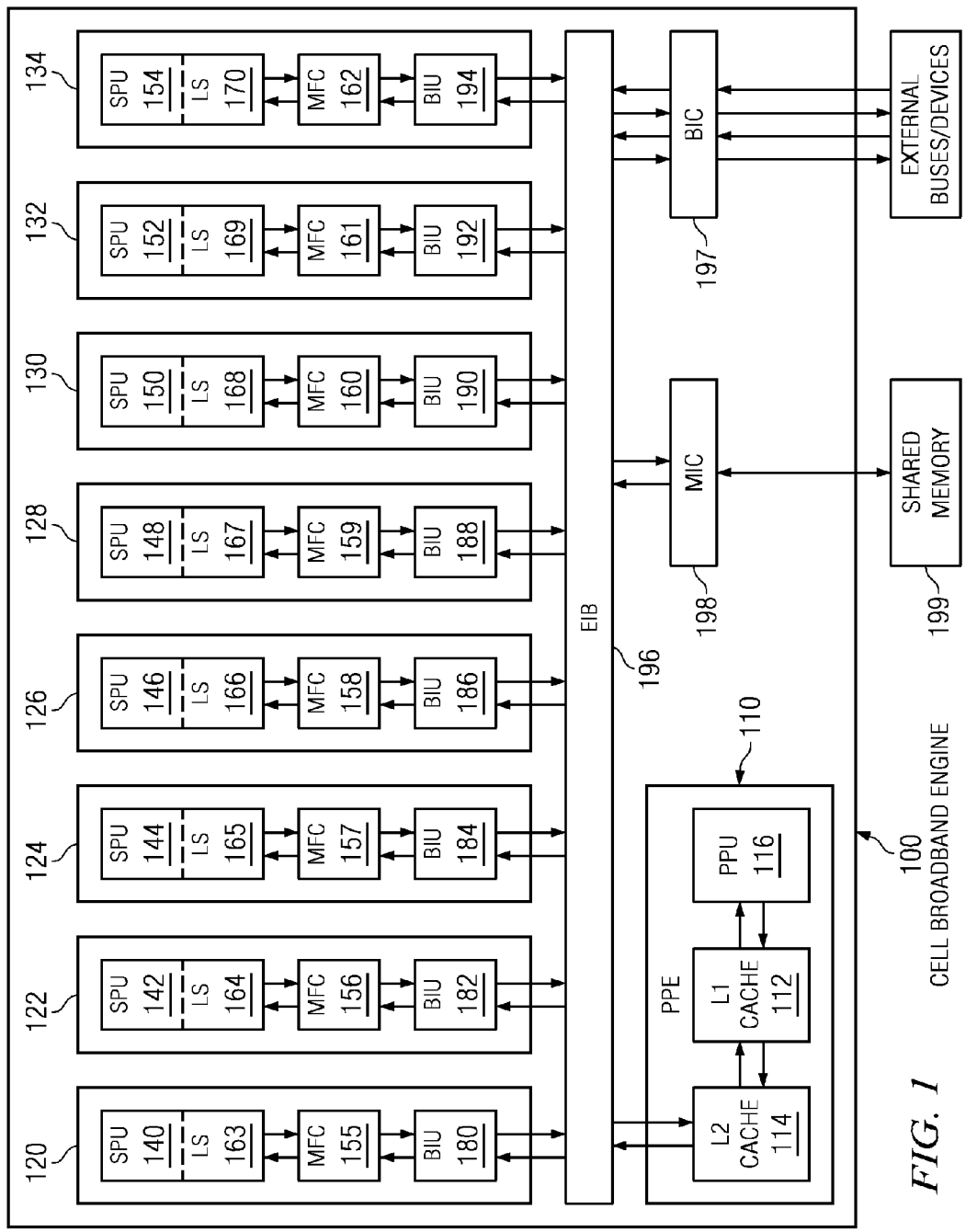
FIG. 1 is an exemplary block diagram of a data processing system in which aspects of the present invention may be implemented.

Thus, the illustrative embodiments may be utilised in many different types of data processing environments including a distributed data processing environment, a single data processing device, or the like. In order to provide a context for the description of the specific elements and functionality of the illustrative embodiments. FIG. 1 is provided hereafter as exemplary environments in which exemplary aspects of the illustrative embodiments may be implemented. While the description following FIG. 1 will focus primarily on a single data processing device implementation, this is only exemplary and is not intended to state or imply any limitation with regard to the features of the present invention. To the contrary, the illustrative embodiments are intended to include distributed data processing environments, grid computing environments, and so forth.

FIG. 1 is an exemplary block diagram of a data processing system in which aspects of the present invention may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface and (BIU unit) 180-194 which may be, for example, a combination direct memory access (DMA), memory management unit (MMU), and bus interface unit. A high bandwidth internal element interconnect has (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read/write from/to the local store 163-170 as long as the local store is not placed in a secure mode of operation, in which case only its associated SPU may access the local store 163-170 or a designated secured portion of the local store 163-170.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the FPU, e.g., the PPU may execute Reduced instruction Set Computer (RISC) based instructions while the SPU execute vectorized instructions.

The SPEs 120-134 are coupled to each other and to the L2 cache 114 via the EIB 190. In addition, the SPEs 120-134 are coupled to MIC 198 and BIC 197 via the EIB 196. The MIC 108 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFlops of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

The general matrix multiply (GEMM) is a subroutine in the basic linear algebra subprograms (BLAS) which performs matrix multiplication that is the multiplication of two matrices. A double precision general matrix multiply (DGEMM) is often tuned by high performance computing (HPC) vendors to run as fast as possible, because it is the building block for so many other routines. It is also the most important routine in the Linpack benchmark. For this reason, implementations of fast BLAS library may focus first on DGEMM performance.

Figures 2, 3:
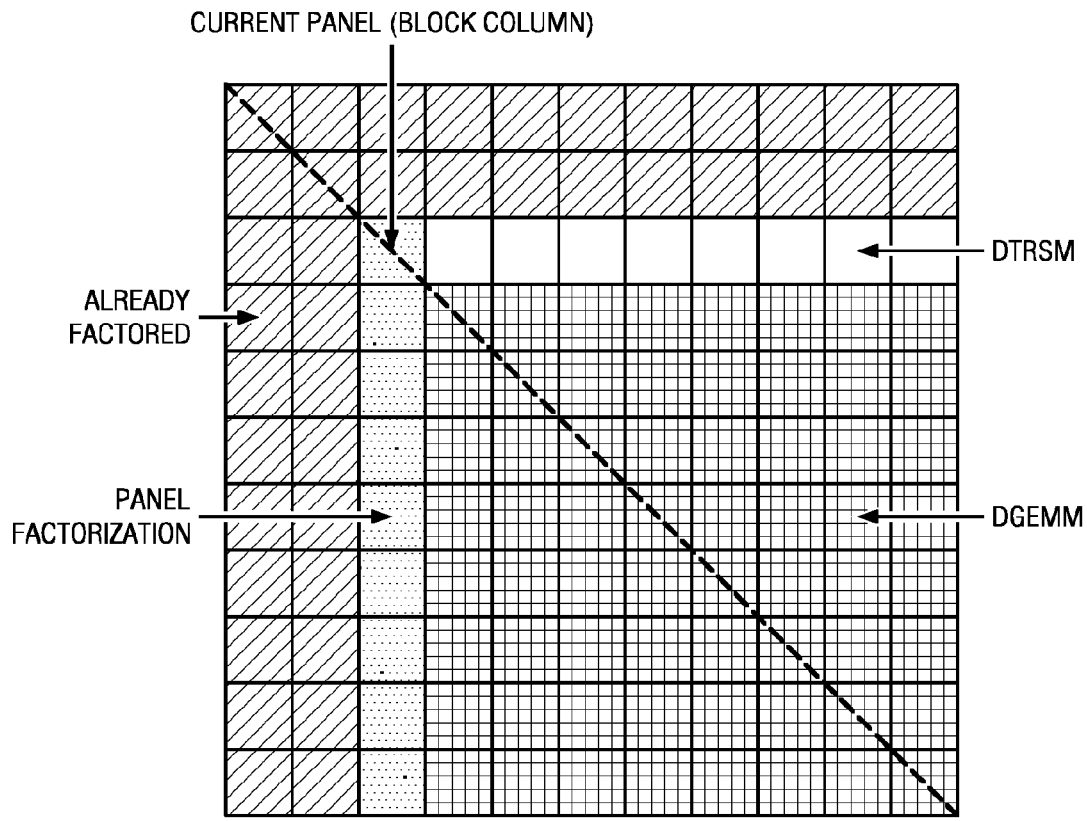
FIG. 2 illustrates a blocked DGEMM employed during LU decomposition in accordance with an illustrative embodiment.
FIG. 3 depicts pseudo code for a double precision general matrix multiplication operation in accordance with an illustrative embodiment.

FIG. 2 illustrates a blocked DGEMM employed during LU decomposition in accordance with an illustrative embodiment. LU decomposition is a matrix decomposition that writes a matrix as a product of a lower (L) and upper (U) triangular matrix. This product may be used in numerical analysis to solve problems of linear equations or to calculate the determinant. The specific matrix multiplication applied during LU decomposition may use a DGEMM of the form:

$$[C] -= [A] * [B]$$

Where [C], [A], and [B] are block matrices and the "−=" operator indicates an operation of multiplying [A] and [B], subtracting the product from [C], and storing foe result back to [C].

The LU decomposition is typically performed using a blocked, right-looking algorithm, where each iteration produces a portion of the final factorization and leaves a reduced region of the matrix (the trailing sub-matrix) to be solved by the next iteration. This approach allows much of the computation to be performed using matrix-matrix (BLAS3) operations, which are much more efficient than vector-vector (BLAS1) or matrix-vector (BLAS2) operations on modern computer systems with deep memory hierarchies. The high-level flow is as follows:

Iterating over block columns 1 to N/M:
    Panel Factorization—factor current block column
    Forward Pivot trailing sub-matrix
    Compute block row of upper (U) matrix using a triangular solve with multiple right-hand-sides (DTRSM)
    Update trailing sub-matrix (DGEMM)
Compute solution of the given system FIG 2. depicts the block LU decomposition during the third iteration of a matrix of eleven blocks. The diagonally-hatched blocks have been factored during the first and second iterations. Blocks highlighted with a fine dither pattern correspond to the L (left) panel being factorized during the third iteration. The U (upper panel), non-patterned blocks of FIG. 2, are solved using the BLAS3 DTRSM function. The DTRSM function solves for [x] the matrix equation [a][x]=[b]. Matrix [a] is the unit lower triangular matrix of the top block of the factorized L panel and matrix [b] is U panel. The solution replaces the U panel in the matrix. Finally the checkered blocks are updated using the BLAS3 DGEMM function where [A] is the factor L panel, [B] is the solved U panel, and C is the trailing (unsolved) sub-matrix.

FIG. 3 depicts pseudo code for a double precision general matrix multiplication operation in accordance with an illustrative embodiment. The pseudo code in FIG. 3 represents a double precision general matrix multiplication (DGEMM) solve of block column be with a matrix of size N and a block size of M. The notation. $[C_{x,y}]$, represents the block of matrix C indexed by x and y. For improved understanding, the pseudo code utilizes only single buffered data transfers for simplicity of illustration.

As seen in FIG. 3, the DGEMM operation starts with x=bc+1 and increments x for x<N/M. For each x, the DGEMM operation gets (loads) a block, $[B_{x,bc}]$. The DGEMM operation then sets y=bc+1 and increments y for y<N/M. For each y, the DGEMM operation gets (loads) blocks $[A_{bc,y}]$ and $[C_{x,y}]$ and then performs a block matrix multiply of $[C_{x,y}]-=[A_{bc,y}]*[B_{x,bc}]$. Then, the DGEMM operation puts (stores) the resulting block $[C_{x,y}]$. The DGEMM operation repeats for each y in the inner loop and for each x in the outer loop.

FIG. 4 is a table illustrating an example timeline for a double precision general matrix multiply solve in accordance with an illustrative embodiment. The table in FIG. 4 represents a double precision general matrix multiply (DGEMM) solve for bc=2 and N/M=6. The mechanism employs double buffering to hide data transfer latency. The mechanism allocates two local store (LS) buffers for each A, B, and C matrix (six buffers in total). The table in FIG. 4 shades the blocks in memory buffer 0 and shows blocks in memory buffer 1 as solid white according to the LS buffer pair (0 and 1) used to achieve double buffering. For example, in time step 0, the mechanism loads $[C_{3,3}]$, $[A_{2,3}]$, and $[B_{3,2}]$ in buffer 0, and in time step 1, the mechanism loads $[C_{3,4}]$ and $[A_{2,4}]$ in buffer 1. In time step 1, the mechanism computes $[C_{3,3}]-=[A_{2,3}]*[B_{3,2}]$. Then, in time step 2, the mechanism loads $[C_{3,5}]$ and $[A_{2,5}]$ in buffer 0 and stores the result from time step 2, $[C_{3,3}]$ using buffer 0.

In the depicted example, to accommodate double buffering of the [A], [B], and [C] blocks, the maximum square, power of 2, block size is 64×64. This consumes 192 kB of local store (LS) memory. The remaining 64 kB of LS memory is available for code, stack, and other data buffers. Each synergistic processor element (SPE) of a Cell Broadband Engine (Cell/B.E.) processor is capable of a block multiply in approximately 133,000 cycles. To keep from being transfer limited (assuming a clock speed of 3.2 GHz for each SPE), all data transfers during each time step must be completed in 41.5 μs. If all eight SPEs attempt to transfer four blocks simultaneously (e.g., in time steps 3 and 6 in FIG. 4), then the mechanism requires 25.3 GB/s memory throughput in order to avoid a memory stall. (This rate, and all rates expressed herein assume a block matrix multiply efficiency of 99%. This efficiency has been shown to be achievable on the SPE of the Cell/B.E., for example.)

These access patterns (mixed loads and stores of 32 kB blocks) require a high throughput. One solution to reduce data bandwidth requirements is to increase the block size. Since the computation time (time step) is $O(n^3)$ and the data transfer is $O(n^2)$, increasing n decreases the relative bandwidth requirements. However, the LS of a SPE in a Cell/B.E. processor places a strict limit on the maximum value of n. The practical maximum size of n a 256 kB LS, for example, can accommodate is 70. A block size of 70 only reduces the maximum bandwidth from 25.3 GB/s to 23.6 GB/s.

In accordance with an illustrative embodiment, a mechanism for block matrix multiplication reduces the variability in data transfers by eliminating an extra block transferred during "corner turns." In the example depicted, in FIG. 4, corner turns occur at time steps 3 and 6. The mechanism of the illustrative embodiment accomplishes the elimination of the extra block transfer by processing the blocks in an alternate order. Eliminating the extra block allows the elimination of a local store buffer as well.

By reversing the visitation order of the [A] and [C] for every other [C] column, the mechanism eliminates the [A] block loads at the corner turns. In accordance with the illustrative embodiment, these corner turns may be referred to as "bounce" corner turn and result in a serpentine patterned processing order of the matrix blocks.

FIG. 5A illustrates block load order for block matrix multiplication with corner turns in accordance with one exemplary embodiment. In the depicted example, the mechanism loads block $[C_{3,3}]$, block $[C_{3,4}]$, block $[C_{3,5}]$, and then goes to the top of the column and loads block $[C_{4,3}]$, block $[C_{4,4}]$, and block $[C_{4,3}]$, and so on. For each corner turn, the mechanism goes to the top of the next column to load the next C block.

FIG. 5B illustrates a block load order for block matrix multiplication with bounce corner turns in accordance with an illustrative embodiment. In the depicted example, the mechanism loads block $[C_{3,3}]$, block $[C_{3,4}]$, block $[C_{3,5}]$, and then loads block $[C_{4,5}]$, block $[C_{4,4}]$, and block $[C_{4,3}]$, and so on. For each corner turn, the mechanism reverses the visitation order, which results in a serpentine patterned processing order of the matrix blocks.

FIG. 6 depicts pseudo code for a double precision general matrix multiplication operation with optimized corner turns in accordance with an illustrative embodiment. The pseudo code in FIG. 6 represents a double precision general matrix multiplication (DGEMM) solve of block column be with a matrix of size N and a block size of M. The notation, $[C_{x,y}]$, represents the block of matrix C indexed by x and y. For improved understanding, the pseudo code utilizes only single buffered data transfers for simplicity of illustration.

As seen in FIG. 6, the DGEMM operation sets Boolean operator down=true and starts with x=be+1 and increments x for x<N/M. Then, the DGEMM operation sets i=1 and increments i for i<(N/M−be). For each i, the DGEMM operation determines whether down=true. If down=true, then the DGEMM operation, sets y=bc+i; otherwise, the DGEMM operation sets y=N/M−i. At the end of each iteration of the outer loop, the DGEMM operation sets down=!down; therefore, in alternate iterations of the outer loop, the DGEMM either increments y from bc or decrements y downward from N/M For each inner loop iteration, the DGEMM operation gets (loads) a block of A or B and gets (loads) one block of C. For each inner loop iteration, the DGEMM operation performs a block matrix multiply operation and puts (stores) a resulting block of C. Thus, the maximum number of block transfers for each iteration (time step) is three.

Figure 7:
FIG. 7 is a table illustrating an example timeline for a double precision general matrix multiply solve with optimized corner turns in accordance with an illustrative embodiment.

FIG. 7 is a table illustrating an example timeline for a double precision general matrix multiply solve with optimized corner turns in accordance with an illustrative embodiment. The table in FIG. 7 represents a double precision general matrix multiply (DGEMM) solve for be=2 and N/M=6. The mechanism employs multi-buffering to hide data transfer latency. As can be seen, the maximum number of block transfers for during any time step has been reduced from four to three. The mechanism allocates two local store (LS) buffers for the C matrix and three LS buffers for the A and B matrices (five buffers in total).

The table in FIG. 7 shades the blocks in memory buffer 0 with a cross hatch, shows blocks in memory buffer 1 as solid white, and shades the blocks in memory buffer 2 according to the LS buffer pair (0 and 1) used to achieve double buffering. For example, in time step 0, the mechanism loads $[C_{3,3}]$ and $[A_{2,3}]$ in butter 0 and loads $[B_{3,2}]$ buffer 1. In time step 1, the mechanism loads $[C_{3,4}]$ in butter 1 and loads $[A_{2,4}]$ in buffer 2. In time step 1, the mechanism computes $[C_{3,3}]-=[A_{2,3}]*[B_{3,2}]$. Then, in time step 2, the mechanism loads $[C_{3,5}]$ and $[A_{2,5}]$ in buffer 0 and stores the result from time step 2, $[C_{3,3}]$ using buffer 0.

As depicted in FIG. 7, time steps 3 and 6 still represent a corner turn. However, the number of block transfers in time steps 3 and 6 is three rather than four. With a peak transfer demand of three blocks per time step, the maximum throughput is reduced from 25.3 GB/s to 19 GB/s. The number of LS buffers is reduced from six (192 kB) to five (160 kB). These results assume a block size of 64×64. The mechanism achieves these improvements with a modest increase in complexity.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area, network (WAN), or the connection may be made to an external computer (for example, through the Interact using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted, in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
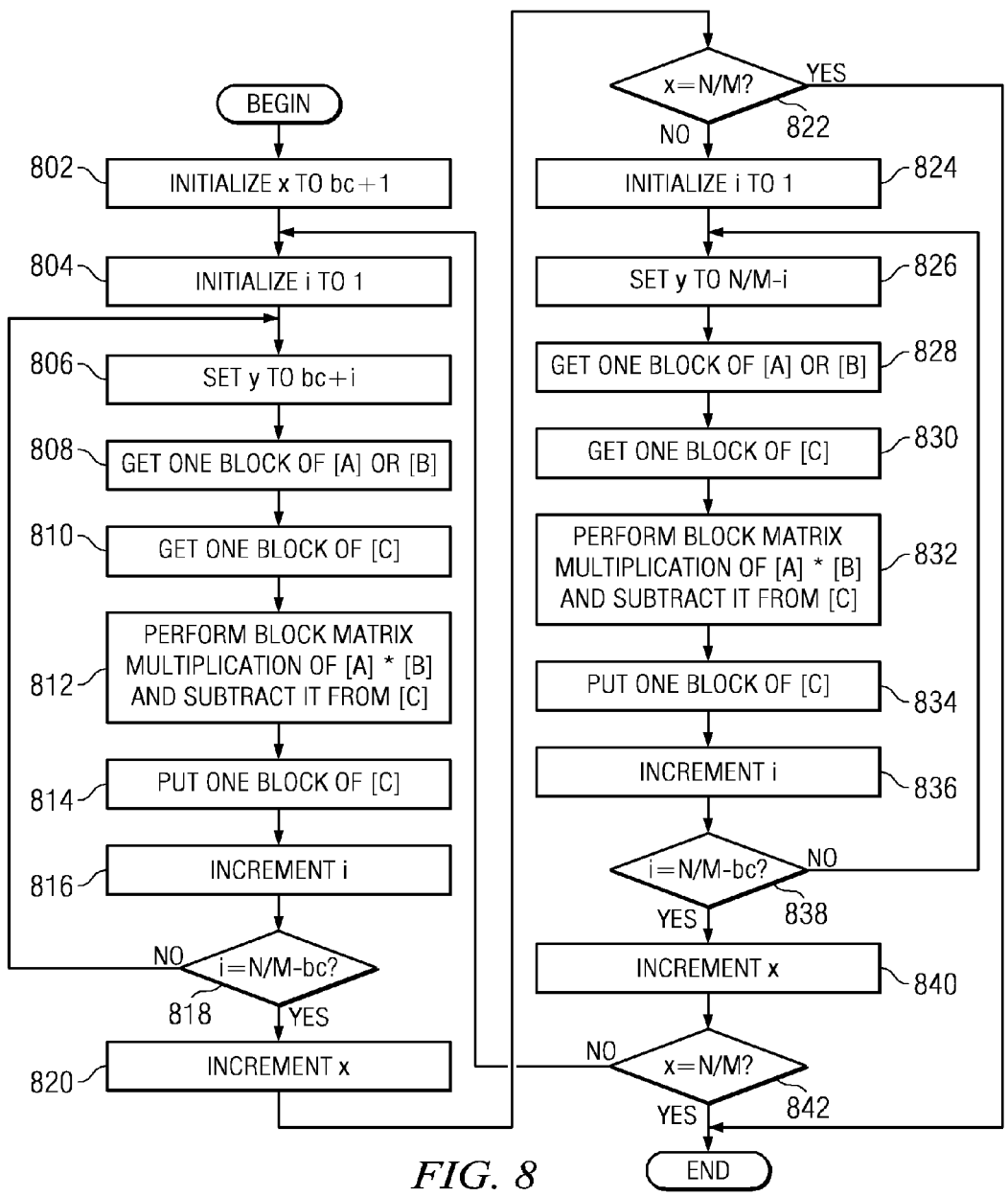
FIG. 8 is a flowchart illustrating operation of a mechanism for performing a block matrix multiplication operation with improved corner turns in accordance with an illustrative embodiment.

FIG. 8 is a flowchart illustrating operation of a mechanism for performing a block matrix multiplication operation with improved corner turns in accordance with an illustrative embodiment. Operation begins and the mechanism, initializes x to bc +1 (block 802). Then, the mechanism initializes i to 1 (block 804). In a first iteration, the mechanism sets y to bc +i (block 806) and gets one block of [A] or [B] (block 808). More particularly, in block 808, if i=1, then the mechanism gets block $[A_{bc,y}]$; otherwise, the mechanism gets block $[B_{x,bc}]$. Then, the mechanism gets one block of [C], $[C_{x,y}]$ (block 810).

Thereafter, the mechanism performs a block matrix multiplication of [A]*[B] and subtracts the product from [C] (block 812). Then, the mechanism, puts one block of [C] (block 814) and increments i (block 816). The mechanism then determines whether i=N/M-bc (block 818). In other words, in block 818, the mechanism determines whether the mechanism reaches the end of the column for the block matrix multiply. If i does not equal N/M-bc in block 818, operation returns to block 806 to repeat the block matrix multiply for the next block.

If i=N/M-bc in block 818, the mechanism increments x (block 820). Then, the mechanism determines whether x=N/M (block 822). In other words, in block 822, the mechanism determines whether the mechanism reaches the end of the block matrix multiply operation. If x=N/M in block 822, then the mechanism has reached the end of the block matrix multiply, and operation ends.

If x does not equal N/M in block 822, then operation proceeds to block 824 to process the next column. The mechanism initializes i to 1 (block 824). The mechanism sets y to N/M-i (block 826). Then, the mechanism gets one block of [A] or [B] (block 828). More particularly, in block 828, if i=1, then the mechanism gets block $[A_{bc,y}]$; otherwise, the mechanism gets block $[B_{x,bc}]$. Then, the mechanism gets one block of [C], $[C_{x,y}]$ (block 830).

Thereafter, the mechanism performs a block matrix multiplication of [A]*[B] and subtracts the product from [C] (block 832). Then, the mechanism puts one block of [C] (block 834) and increments i (block 836). The mechanism then determines whether i=N/M=bc (block 838). In other words, in block 838, the mechanism determines whether the mechanism reaches the end of the column for the block matrix multiply. If i does not equal N/M-bc in block 838, operation returns to block 826 to repeat the block matrix multiply for the next block.

If i=N/M-bc in block 838, the mechanism increments x (block 840). Then, the mechanism determines whether x=N/M (block 842). In other words, in block 842, the mechanism determines whether the mechanism reaches the end of the block matrix multiply operation. If x=N/M in block 842, then the mechanism has reached the end of the block matrix multiply, and operation ends.

If x does not equal N/M in block 842, then operation returns to block 804 to process the next column. Each time, the mechanism reverses the visitation order. In blocks 804-818, y increments from bc+1 to N/M-1; in blocks 824-838, y decrements from N/M-1 to bc+1. Thus, the illustrative embodiments provide mechanisms for reversing the visitation order of blocks at corner turns when performing a block matrix multiplication operation in a data processing system. By reversing the visitation order, the mechanism eliminates a block load at the corner turns. In accordance with the illustrative embodiment, a corner return is referred to as a "bounce" corner turn and results in a serpentine patterned processing order of the matrix blocks. The mechanism allows the data processing system to perform a block matrix multiplication operation with a maximum of three block transfers per time step. Therefore, the mechanism reduces maximum throughput and increases performance.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input-output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored thereon, wherein the computer readable program, when executed on a computing device, causes the computing device to:
- allocate a first set of buffers in a local store for a first block matrix and a second block matrix, wherein the first set of buffers comprises at most three local store buffers and wherein each buffer within the first set of buffers stores at most one block of data;
- allocate a second set of buffers in the local store for a result block matrix, wherein the second set of buffers comprises at most two local store buffers and wherein each buffer within the second set of buffers stores at most one block of data;
- for a first column of the result block matrix, perform a block matrix multiplication operation comprising:
  - performing a direct memory access operation to load one block in a row of the first block matrix from a system memory into the first set of buffers in the local store;
  - for each block in the first column of the result block matrix and each block in a column of the second block matrix:
    - performing a direct memory access operation, employing multi-buffering to hide data transfer latency, to load the block of the result block matrix from the system memory to the second set of buffers in the local store according to a visitation order;
    - performing a direct memory access operation, employing multi-buffering to hide data transfer latency, to load the block of the column of the second block matrix from the system memory into the first set of buffers in the local store according to the visitation order;
    - performing a multiplication operation on the block of the first block matrix and the block of the second block matrix to form a product;
    - subtracting the product from the block of the result block matrix to form a result block of the result block matrix in the second set of buffers; and
    - performing a direct memory access operation to store the result block from the second set of buffers in the local store to the system memory;
- reverse the visitation order; and
- repeat the block matrix multiplication operation for a next column of the result block matrix with the reversed visitation order reusing a last loaded block of the column of the second block matrix responsive to reversing the visitation order.

2. The computer program product of claim 1, wherein performing a block matrix multiplication operation comprises performing the multiplication operation on a block of the first block matrix and a block of the second block matrix loaded in a previous time step.

3. The computer program product of claim 1, wherein storing the result block comprises storing a result block of the result block matrix foamed in a previous time step.

4. The computer program product of claim 1, wherein the computer readable program further causes the computing device to:
- repeat reversing the visitation order and repeating the block matrix multiplication operation for remaining columns of the result block matrix.

5. An apparatus, comprising:
a processor; and
a memory coupled to the processor, wherein the memory comprises instructions which, when executed by the processor, cause the processor to:
- allocate a first set of buffers in a local store for a first block matrix and a second block matrix wherein the first set of buffers comprises at most three local store buffers and wherein each buffer within the first set of buffers stores at most one block of data;
- allocate a second set of buffers in the local store for a result block matrix, wherein the second set of buffers comprises at most two local store buffers and wherein each buffer within the second set of buffers stores at most one block of data;
- for a first column of the result block matrix, perform a block matrix multiplication operation comprising:
  - performing a direct memory access operation to load one block in a row of the first block matrix from a system memory into the first set of buffers in the local store;
  - for each block in the first column of the result block matrix and each block in a column of the second block matrix:
    - performing a direct memory access operation, employing multi-buffering to hide data transfer latency, to load the block of the result block matrix from the system memory to the second set of buffers in the local store according to a visitation order;
    - performing a direct memory access operation, employing multi-buffering to hide data transfer latency, to load the block of the column of the second block matrix from the system memory into the first set of buffers in the local store according to the visitation order;
    - performing a multiplication operation on the block of the first block matrix and the block of the second block matrix to form a product;
    - subtracting the product from the block of the result block matrix to form a result block of the result block matrix in the second set of buffers; and
    - performing a direct memory access operation to store the result block from the second set of buffers in the local store to the system memory;
- reverse the visitation order; and
- repeat the block matrix multiplication operation for a next column of the result block matrix with the reversed visitation order reusing a last loaded block of the column of the second block matrix responsive to reversing the visitation order.

6. The apparatus of claim 5, wherein performing a block matrix multiplication operation comprises performing the multiplication operation on a block of the first block matrix and a block of the second block matrix loaded in a previous time step.

7. The apparatus of claim 5, wherein storing the result block comprises storing a result block of the result block matrix formed in a previous time step.

8. The apparatus of claim 5, wherein the instructions further cause the processor to:
- repeat reversing the visitation order and repeating the block matrix multiplication operation for remaining columns of the result block matrix.

* * * * *